United States Patent [19]

Dirks

[11] Patent Number: 4,790,158
[45] Date of Patent: Dec. 13, 1988

[54] LOCKING MECHANISM FOR DOORS OF SWITCHING CELLS

[75] Inventor: Rolf Dirks, Willich, Fed. Rep. of Germany

[73] Assignee: Felten & Guilleaume Energietechnik GmbH, Cologne, Fed. Rep. of Germany

[21] Appl. No.: 919,080

[22] Filed: Oct. 14, 1986

Related U.S. Application Data

[62] Division of Ser. No. 720,143, Apr. 4, 1985, Pat. No. 4,674,305.

[30] Foreign Application Priority Data

Apr. 4, 1984 [DE] Fed. Rep. of Germany ....... 3412612

[51] Int. Cl.$^4$ ............................................. E05B 65/06
[52] U.S. Cl. ...................................... 70/139; 70/160; 292/5; 292/52; 292/304
[58] Field of Search ................. 70/139, 144, 145, 158, 70/159, 160, 161, 162; 292/5–7, 44, 52, 54, 144, 218, 226, 228, 304

[56] References Cited

U.S. PATENT DOCUMENTS 341,745 5/1806 Gillis ................................. 292/228

FOREIGN PATENT DOCUMENTS 1465529 10/1971 Fed. Rep. of Germany .

Primary Examiner—Robert L. Wolfe
Attorney, Agent, or Firm—Michael J. Striker

[57] ABSTRACT

A pressure-resistant locking mechanism for locking a door of a switch cell accommodating a switching device includes two pivotable locking bars positioned in hollows formed by U-shaped door edges and U-shaped portions of the wall of the switch cell at a hinge side of the door and a closing side of the door. The locking bars are pivoted between a locked position and a released position by pivoting levers against the forces of respective springs. The springs always urge the locking bars to the rest position.

5 Claims, 5 Drawing Sheets

LOCKING MECHANISM FOR DOORS OF SWITCHING CELLS

This is a division of application Ser. No. 720,143 filed Apr. 4, 1985 now U.S. Pat. No. 4,674,305.

BACKGROUND OF THE INVENTION

The present invention relates to a locking mechanism resistant to pressures and utilized for locking doors of switching cells of a switching device or switching board.

The locking mechanisms of the foregoing type have been required to effectively absorb overpressures caused by electric arc short circuit in the switch field and to thereby protect personnel and the switch plant. Since the doors, particularly for high voltage switching cells are subject to very large pressure forces occurring due to the above described effect these forces are very difficult control. Conventional hinges and locks can not withstand to such pressure forces and can be damaged by an arc short circuit. Thus pressure waves and hot arc gases can spread outside of the switching cell and lead to damages.

A housing for an electric device has been proposed, the doors of which are locked by a key-bolt or a locking bar against the action of explosive pressures occurring within the housing of the electric device. A pressure-resistant locking device for flat doors closing high-voltage switching cells, formed of sheet material, is known, in which a locking bar extends over the entire length of the door edge, and the door is secured against pressure increase from inside. Such a locking device is disclosed in DE-PS No. 1,465,529. The locking bar is applied to the closing side and also to the hinge side of the door. The pivotable locking bars must be locked depending on respective functions of the switching cell. There is, however, a danger that an operator may forget to lock such a locking bar.

SUMMARY OF THE INVENTION

It is an object of the present invention to provide an improved pressure-resistant locking mechanism for locking doors of switching cells.

It is another object of the present invention to provide a locking mechanism that would be always effective when the door is closed.

These and other objects of the present invention are attained by a pressure-resistant locking mechanism for locking doors of switching cells, wherein a door to be locked is hinged to a switch cell and has a U-shaped cross-section and has inwardly curved edges and a switching cell has an outer wall having U-shaped, outwardly extending edges which define with the inwardly curved edges of the door two opposing hollow spaces extending over the entire length of the door, the locking mechanism comprising two torsion bars pivotable between a locked position and a released position and mixed to a hinge side and a closing side the door and each being received in a respective hollow space and having a non-central axis of elongation; two pivotable lever each rigidly connected to a respective pivotable bar at one end thereof and having a free end; and two springs connected to an inner side of the door and each being suspended on the free end of a respective lever so that each torsion bar remains in the locked position when the spring assigned thereto is unloaded and reaches the released position when the lever connected thereto is pivoted outwardly by 90° and said spring is loaded.

The chief advantage of the present invention resides in that the locking mechanism, including two pivoting bars, one of which is positioned on a hinge side of the door and the other is positioned on a closing side of the door, is always pulled to its rest position. Therefore it is prevented that an operator can forget to lock the torsion bars.

With the locking mechanism of this invention, upon opening of the door, after the completion of pivoting of one of said levers, the assigned torsion bar positioned on a closing side of the door pivots to the locked position and another torsion bar positioned on the hinge side abuts against one outwardly extending edge of said wall, and upon closing of the door the torsion bar positioned on said closing side comes into engagement with the outwardly extending edge of said wall at said closing side, whereby said torsion bar rotates in clockwise direction against the force of the assigned spring and the torsion bar positioned on the hinge side presses against the outwardly extending edge and rotates in the counter clockwise direction against the force of the assigned spring, and said two torsion bars being arrested in said locked position after they have overcome respective outwardly extending edges of said wall.

Inasmuch as an actuation opening for the insertion of the switching lever into the shaft of the switch device, positioned in the switch cell, is formed in the door it is expedient to prevent opening of the door when the switch device is in operation. Therefore the mechanism may further include a locking slide connected to the torsion bar on said closing side and operated for closing said actuation opening when the door is opened.

The locking slide may be formed by a rod, said rod having a recess corresponding to said actuation opening; and further include at least one bolt for movably supporting said locking slide on said door, and a connecting rod pivotally connected to said locking slide at one end thereof and also pivotally connected to the torsion bar on the closing side at another end thereof. It is advantageous that the torsion bar is coupled with an additional lock which prevents a false operation of the switch device.

It is impossible with the open door to insert the switching lever into the shaft of the switch device, because a smallest distance from the actuation opening to the actuation shaft, with the opened door, is greater than the length of the insertion portion of the switching lever.

An auxiliary switch may be provided in the switch cell, said auxiliary switch having an actuating lever extending in the hollow space receiving the torsion bar on the closing side; an electromagnetic switch may be further provided in the switch cell at the hinge side, said electromagnetic switch having a locking rod and being connected to said auxiliary switch which switches on the electromagnetic switch when the door is opened; a spring may be suspended on said wall of the switch cell, said electromagnetic switch pulling said locking rod against the force of said spring so as to position an opening in said locking rod against said actuation opening, the torsion bar on the closing side returning to its locking position after the end of opening of the door, whereby the auxiliary switch switches off the electromagnetic switch and the actuation opening is released.

The mechanism may further include a stop pin which limits a movement of said locking rod.

The novel features which are considered as characteristic for the invention are set forth in particular in the appended claims. The invention itself, however, both as to its construction and its method of operation, together with additional object and advantages thereof, will be best understood from the following description of specific embodiments when read in connection with the accompanying drawing.

DETAILED DESCRIPTION OF THE PREFERRED EMBODIMENTS

Figure 1:
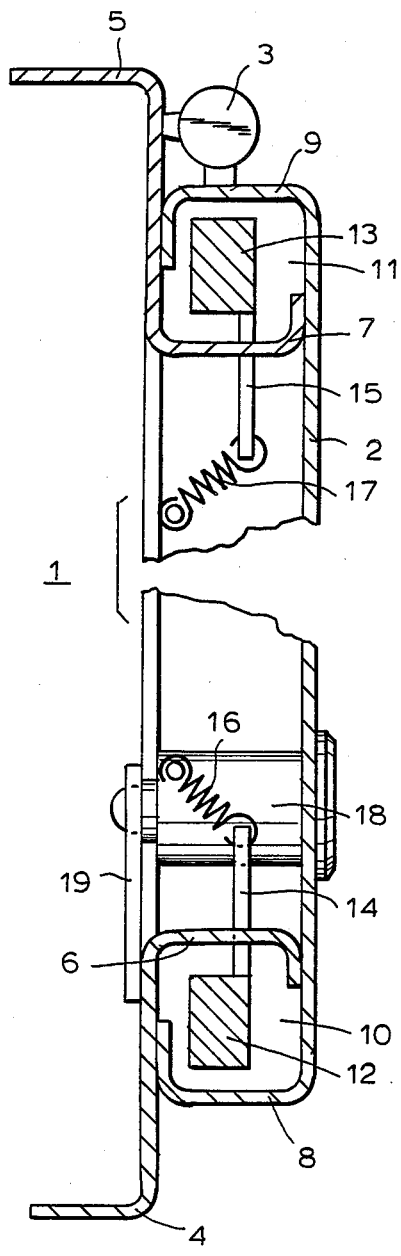
FIG. 1 is a side sectional view of a switch cell with a closed door, locked-up torsion bars and a closed catch.
Figure 2:
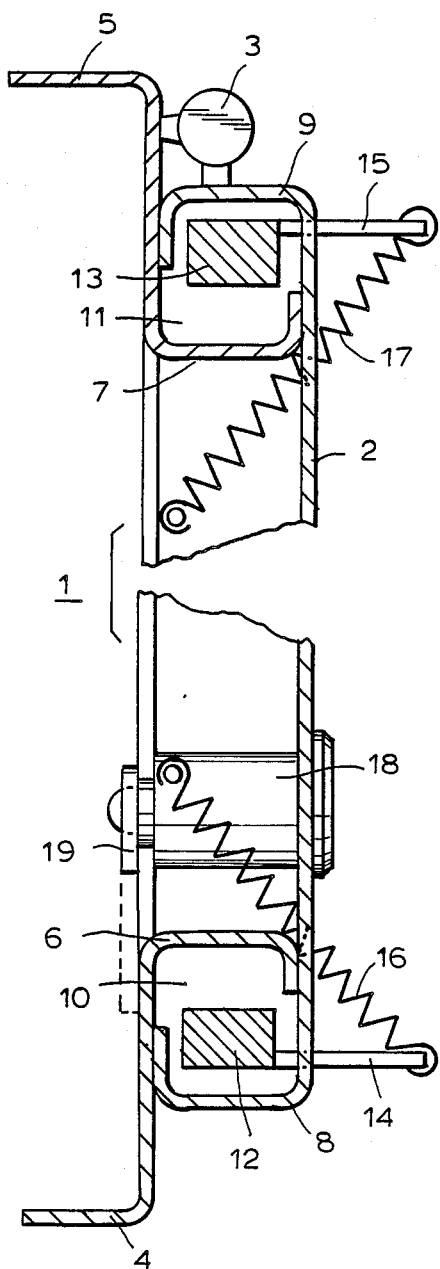
FIG. 2 is a side sectional view of the switch cell of FIG. 1, but with a closed door, unlocked torsion bars and opened catch.
Figure 3:
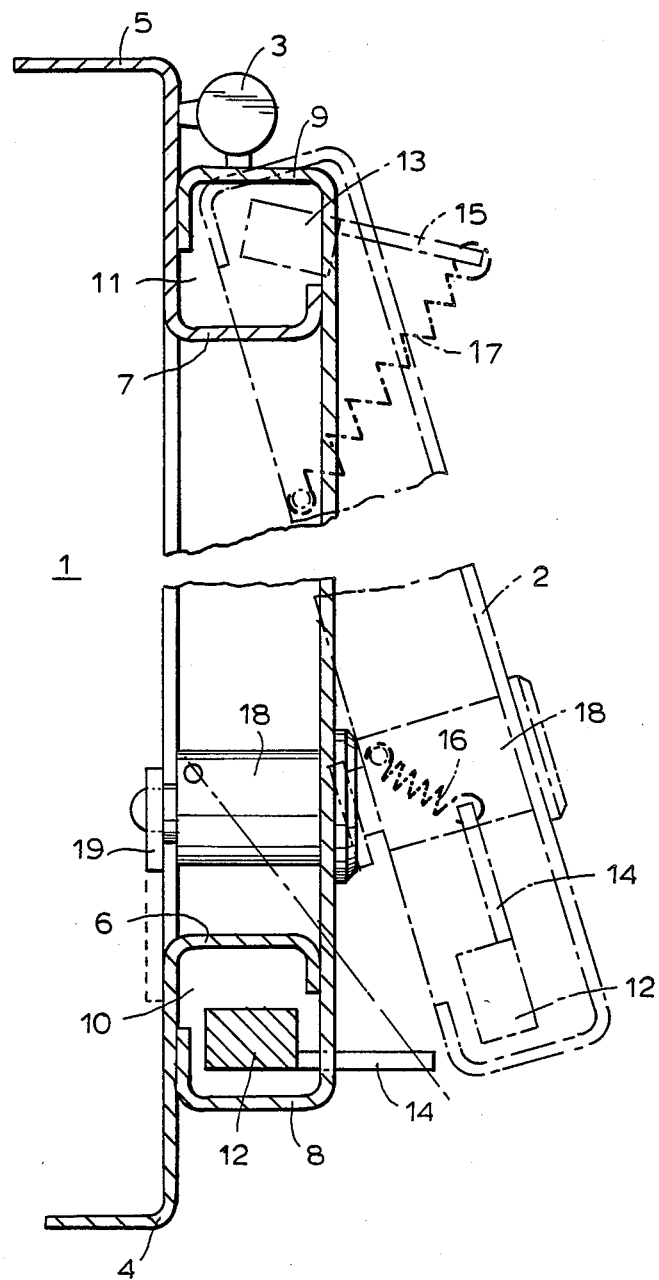
FIG. 3 is a side sectional view of the switch cell with an opened door, unlocked torsion bars and opened catch.

Referring now to the drawings in detail it will be seen that FIGS. 1 through 3 illustrate a switch cell generally designated by reference numeral 1 and having a front side which is closed by a door 2. The door is pivotally positioned on a cell wall 5 by means of a hinge 3. A cell wall portion positioned at the closing side of the door is denoted by a reference numeral 4. Both cell walls 4 and 5 have U-shaped edge portions 6 and 7 which open outwardly and provided at the respective regions of the door 2. The door at these regions has U-shaped edge portions 8 and 9 which open inwardly. When the door is closed hollow spaces 10 and 11, which extend over the entire length of the door, are formed at those regions between the respective edge portions of the cell walls and the door. Torsion or pivoting bars 12 and 13 are positioned in these hollow spaces. These bars respectively define the lengths of the hollow spaces. The torsion bars 12, 13 are of rectangular cross-section but have non-centrally positioned axes. Levers 14 and 15 are arranged as extensions of elongated torsion bars. Levers 14 and 15 are at the ends thereof rigidly connected, for example by welding, to the torsion bars 12 and 13, respectively; the opposite ends of the levers 14 and 15 are connected to respective springs 16 and 17 which have rigid suspension points on the inner side of the door. A lock 18 is mounted to the door, which lock is provided with a catch 19 at the inner side. When door 2 is closed catch 19 engages behind the U-shaped edge portion 6 of the cell wall.

In order to open door 2 it is first necessary to actuate lock 18. For this propose catch 19 is moved from its locked position. Then both levers 14 and 15 are also moved from the locked position to a released position.

As soon as door 2 is completely opened the torsion bar 12 is pulled again to its locked position by spring 16 whereas torsion bar 13 comes into engagement with the edge on the end of the U-shaped portion 7 and thus the return of the torsion bar 13 to the locked position is prevented.

Upon closing of the door the torsion bar 12 firstly engages at the end of the U-shaped portion 6, then pivots by a small amount in the counterclockwise direction and against the force of spring 16 and returns, after overcoming the edge portion 6, to the locked position. The torsion bar 13 returns to the locked position after overcoming the edge portion 7.

Figure 4:
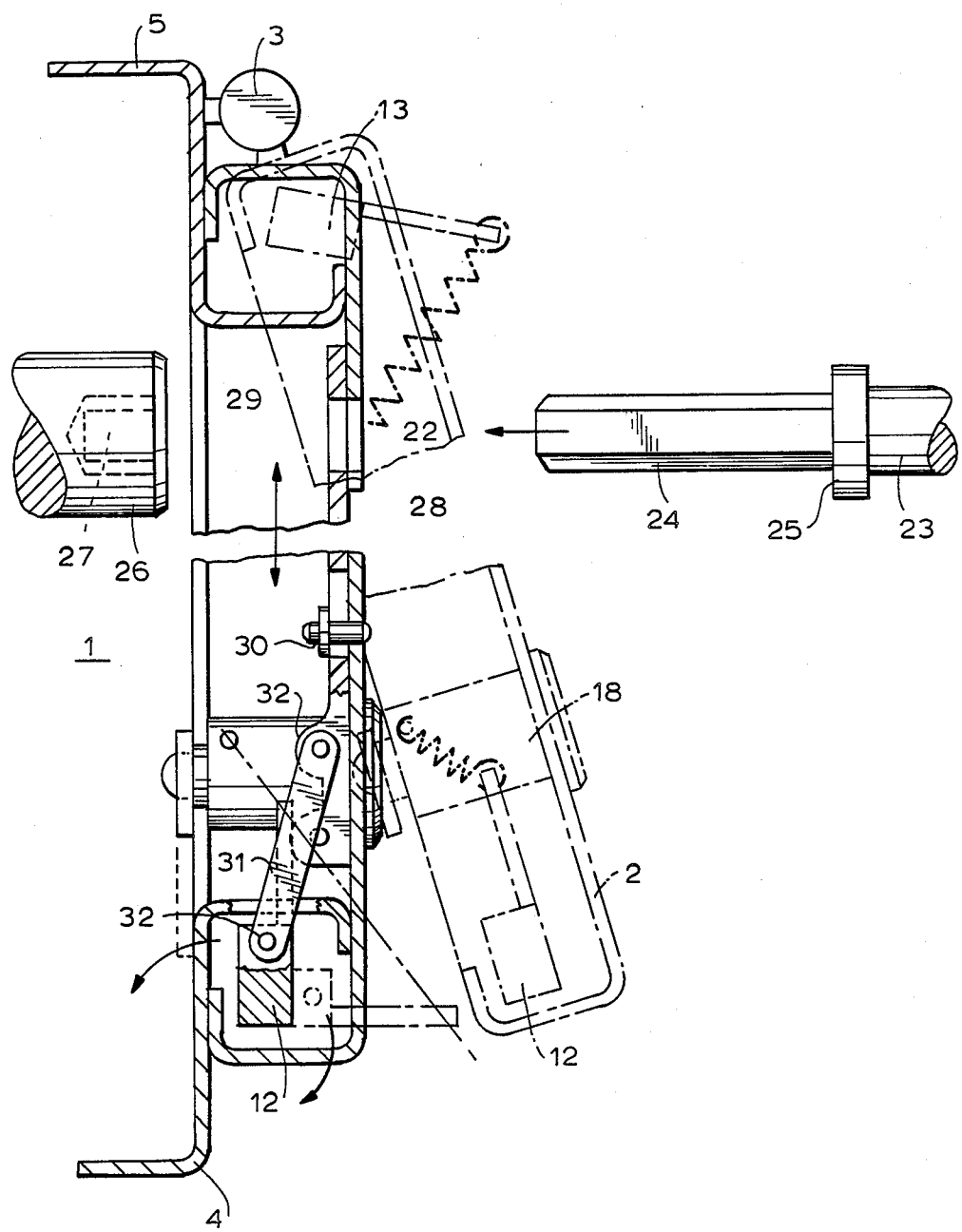
FIG. 4 is a side sectional view of the switch cell with a closed door and opened locking slide, and with an opened door and closed slide.

As shown in FIG. 4 an actuation opening 22 is provided in the door 2 for the insertion of a switching lever 23. The switching lever 23 includes a hexagonal end portion 24, flange 25 and an elongated portion extended from flange 25 in the righthand direction in the plane of the drawing. Flange 25 limits the elongation of the end portion 24 of the switching lever. A counter piece for the switching lever 23, particularly its hexagonal end portion 24, is an inner hexagonal opening 27 provide in an actuation shaft 26 positioned inside of the switch cell. A locking slide 28 provided on the inner side of the door has a cut 29, the size of which is adjusted to an actuation opening formed in the door. Only with the closed and locked door by means of torsion bars it is possible to insert the switching lever 23 into the actuation shaft 26. As soon as the torsion bar 12 is pivoted the locking slide 28 is displaced by means of a pulling rod 31, pivotally connected to the torsion bar 12, unless the actuation opening 22 for the insertion of the switching lever 23 is blocked. The locking slide 28 is connected to the door by bolts 30. Connecting rods 32 serve the purpose of connecting the pulling rod 31 with the locking slide 28 and the torsion bar 12.

As soon as the door is slightly opened and after the end of the actuation of the torsion bar 12, the locking slide is displaced to its old position, which means that the actuation opening 22 and recess or cut 22 would overlap each other. However, it is impossible in this case to insert the switching lever 23 into the actuation shaft 26 because the smallest distance of the actuation opening 22 from the actuation shaft in the case of the open door is greater than the length of the free end the switching lever 23, limited by the flange 25.

Figure 5:
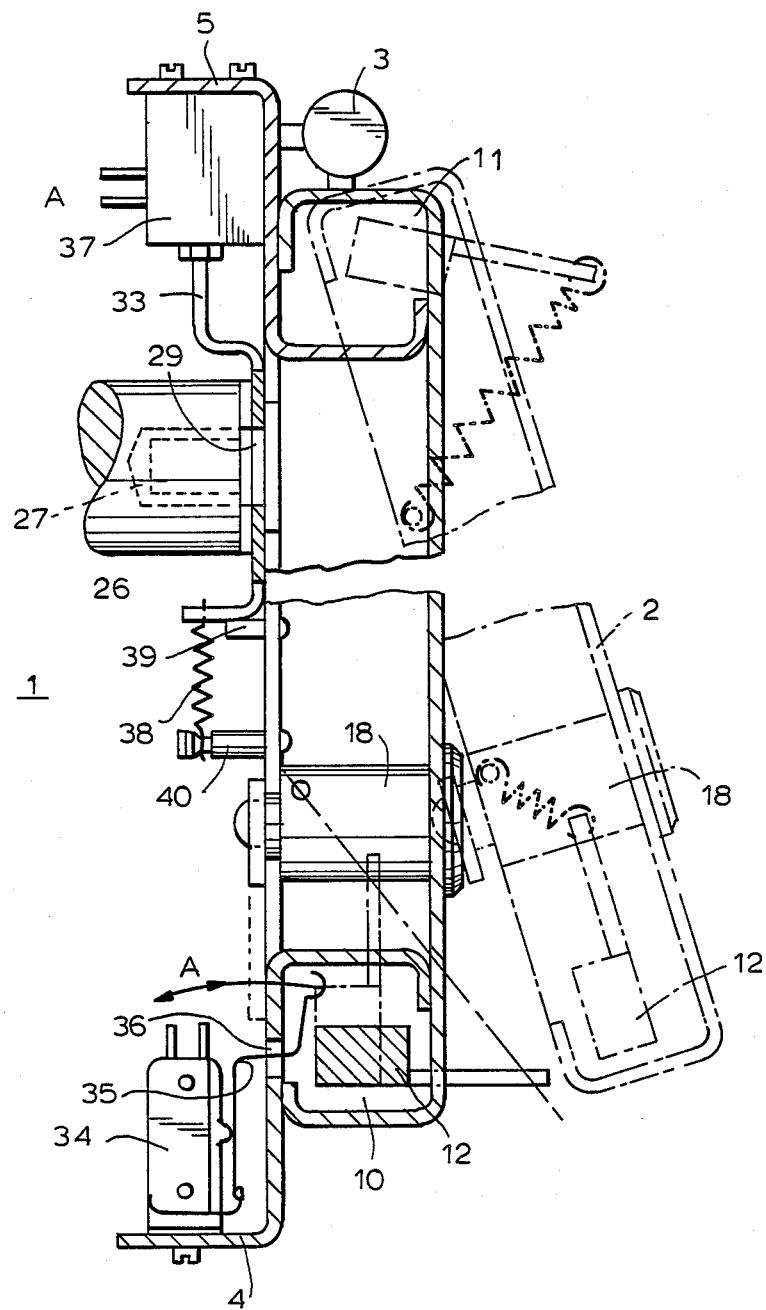
FIG. 5 is a side sectional view of the switch cell with a closed door and an opened locking rod, and with an opened door and closed rod.

As seen from FIG. 5 the locking of the actuation opening 22 in the door can be executed by means of an electromagnetically actuated locking rod 33. This locking rod operates depending on the torsion bar 12 on the closing side. An auxiliary switch 34 is provided in the vicinity of the torsion bar 12 inside the switch cell. An actuating lever 35 is a part of the auxiliary switch 34. The actuating lever 35 extends through an actuation opening 36 into the hollow space 10 of the door so that the auxiliary switch is actuated when the torsion bar 12 is in its released position. The auxiliary switch is electrically connected to an electromagnet 37 by leads A. Upon the energizing of the electromagnet 37 the locking rod 33 connected therewith will be moved to take a position in front of the actuation opening of the door. This takes place against the force of a spring 38 which is interconnected between the end of the locking rod 33 and a suspension bolt 40. The locking rod is angularly bent at the end thereof connected to spring 38. A stop pin 39 is provided to ensure that a cut or recess 29 formed in the locking rod 33 would take an exact position, in which this cut will overlap the inner hexagonal recess 27 provided in the actuation shaft 26.

Figure 6:
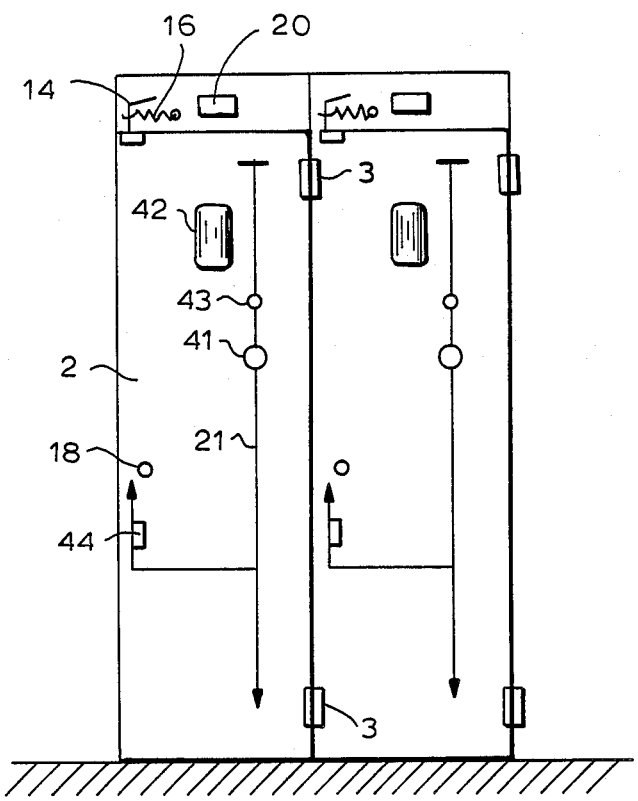
FIG. 6 is a schematic front view of a two-portion switching device with closed and locked doors.

FIG. 6 illustrates a two-door switching device or switch board in which the respective closing side has the locking mechanism with the above-described torsion bars. Only lever 14 and spring 16 are visible, which are provided for the required actuation of the torsion bars. An indication screen 20 is positioned above the door 2. A circuit wiring 21 is mounted to the door itself. A drive inlet 41, a switch position indicator 43 and a ground-drive inlet 44 are also provided on each door 2. A window 42 serves for observing the conditions of the switching device positioned inside the cell.

Figure 7:
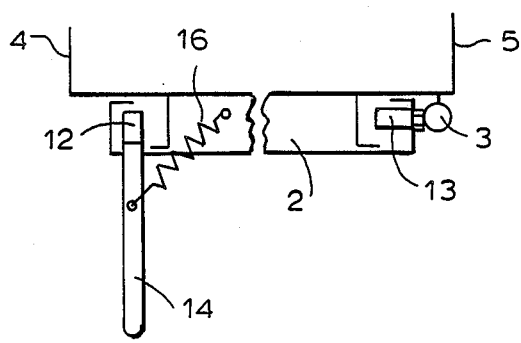
FIG. 7 is a portion of the switch cell with a closed and unlocked door.

FIG. 7 illustrates lever 14 with the torsion bar 12 in a released position. Thereby the locking mechanism of the door 2 is suspended.

Figure 8:
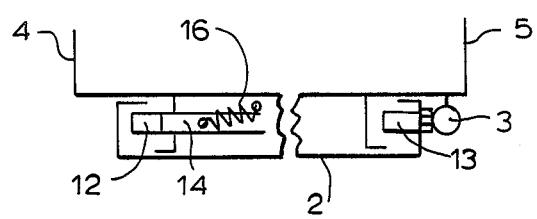
FIG. 8 is a portion of the switch cell of FIG. 7 but with a closed and locked door.

In FIG. 8 lever 14 with the torsion bar 12 are shown in the locking position, and the door 2 is locked.

It will be understood that each of the elements described above, or two or more together, may also find a useful application in other types of pressure-resistant locking mechanisms for doors of switching cells differing from the types described above.

While the invention has been illustrated and described as embodied in a pressure-resitant locking mechanism for a door of a switching cell, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pressure-resistant locking mechanism for locking doors of switch cells, wherein a door to be locked is hinged to a switch cell and has a U-shaped cross-section and inwardly curved edges and a switch cell has an outer wall having U-shaped, outwardly extending edges which define with the inwardly curved edges of the door two opposing hollow spaces extending over the entire length of the door, the locking mechanism comprising two torsion bars pivotable between a locked position and a released position and mounted to a hinge side and a closing side of the door and each being received in a respective hollow space and having a noncentral axis of elongation; two pivotable levers each rigidly connected to a respective pivotable bar at one end thereof and having a free end; two springs connected to an inner side of the door and each being suspended on the free end of a respective lever so that each torsion bar remains in the locked position when the spring assigned thereto is unloaded, and reaches the released position when the lever connected thereto is pivoted outwardly by 90° and said spring is loaded, said door being provided with an actuation opening for passing therethrough a switching lever for a switch device positioned in said switch cell; and a locking slide connected to the torsion bar on said closing side and operated for closing said actuation opening when the door is opened.

2. The mechanism as defined in claim 1, wherein said locking slide is formed by a rod, said rod having a recess corresponding to said actuation opening; and further including at least one bolt for movably supporting said locking slide on said door, and a connecting rod pivotally connected to said locking slide at one end thereof and also pivotally connected to the torsion bar on the closing side at another end thereof.

3. The mechanism as defined in claim 2, wherein said locking slide is displaced to an open position when the door is opened, the switch device positioned in the switch cell being provided with an actuation shaft which receives the switching lever, said switching lever having an insertion portion and a flange limiting said insertion portion, a smallest distance from the actuation opening to the actuation shaft, with the opened door, being greater than the length of said insertion portion.

4. The mechanism as defined in claim 1, wherein an auxiliary switch is provided in the switch cell, said auxiliary switch having an actuating lever extending in the hollow space receiving the torsion bar on the closing side; an electromagnetic switch being provided in the switch cell at the hinge side, said electromagnetic switch having a locking rod and being connected to said auxiliary switch which switches on the electromagnetic switch when the door is opened; and wherein a spring is suspended on said wall of the switch cell, said electromagnetic switch pulling said locking rod against the force of said spring so as to position an opening in said locking rod against said actuation opening, the torsion bar on the closing side returning to its locking position after the completion of opening of the door, whereby the auxiliary switch switches off the electromagnetic switch and the actuation opening is released.

5. The mechanism as defined in claim 4, further including a stop pin which limits a movement of said locking rod.

* * * * *